(12) United States Patent
Ooms et al.

(10) Patent No.: US 7,301,945 B1
(45) Date of Patent: Nov. 27, 2007

(54) DEVICE AND METHOD TO COMPRESS DESTINATION ADDRESSES OF A MULTICAST MESSAGE

(75) Inventors: Dirk Eugène Ida Ooms, Antwerp (BE); Wim Livens, Reet (BE)

(73) Assignee: Alcatel, Paris (FR)

( * ) Notice: Subject to any disclaimer, the term of this patent is extended or adjusted under 35 U.S.C. 154(b) by 510 days.

(21) Appl. No.: 09/422,347

(22) Filed: Oct. 21, 1999

(30) Foreign Application Priority Data

Oct. 12, 1999 (EP) ................................. 99402497

(51) Int. Cl.
*H04L 12/28* (2006.01)
(52) U.S. Cl. ..................................................... 370/390
(58) Field of Classification Search ................ 370/255, 370/300, 312, 389, 390, 392, 393, 432, 477, 370/521

See application file for complete search history.

(56) References Cited

U.S. PATENT DOCUMENTS

| | | | |
|---|---|---|---|
| 5,095,480 A | | 3/1992 | Fenner et al. |
| 5,103,444 A | * | 4/1992 | Leung et al. ................ 370/432 |
| 5,309,433 A | * | 5/1994 | Cidon et al. ................. 370/390 |
| 5,355,371 A | * | 10/1994 | Auerbach et al. ........... 370/255 |
| 5,822,523 A | | 10/1998 | Rothschild et al. |
| 6,014,659 A | * | 1/2000 | Wilkinson et al. .............. 707/3 |
| 6,212,184 B1 | * | 4/2001 | Venkatachary et al. ..... 370/392 |
| 6,236,660 B1 | * | 5/2001 | Heuer ......................... 370/409 |
| 6,247,059 B1 | * | 6/2001 | Johnson et al. .............. 709/237 |
| 6,430,623 B1 | * | 8/2002 | Alkhatib ...................... 709/245 |
| 6,502,140 B1 | * | 12/2002 | Boivie ......................... 709/238 |
| 2002/0029288 A1 | * | 3/2002 | Dobbins et al. ............. 709/238 |

FOREIGN PATENT DOCUMENTS

EP 0 598 969 A1 6/1994

OTHER PUBLICATIONS

Waldvogel et al, Scalable High Speed IP Routing Lookups, Proceedings of SIGCOMM '97, Sep. 1997.*
Nilsson et al, Fast Address Lookup for Internet Routers, Proceedings of IEEE Broadband Communications 98, Apr. 1998.*
Srinivasan et al, Faster IP Lookups usiong Controlled Prefix Expansion, Measurement and Modeling of Computer Systems, pp. 1-10, 1998.*
RFC1458, "Requirements for Multicast Protocols". IETF (Internet Engineering Task Force)—published on Internet at the URL "http://www.cis.ohio-state.edu/htbin/rfcrfc1458.html"—May 1993.
Internet Draft, "draft-ooms-cl-multicast-00.txt"—Connectionless Multicast—Jun. 1999—Version 1.

(Continued)

*Primary Examiner*—Dmitry Levitan
(74) *Attorney, Agent, or Firm*—Sughrue Mion Pllc.

(57) ABSTRACT

To compress a list of destination addresses (A.B.C.D, A.B.C.E, A.F.G.H) of a connectionless multicasted message, addresses (A.B.C.D, A.B.C.E) that have a common prefix (A.B.C) are replaced with a single compound address (A.B.C{D,E}). This compound address (A.B.C{D,E}) is constituted by the common prefix (A.B.C) and a list of suffixes ({D,E}) of these addresses (A.B.C.D, A.B.C.E) that have a common prefix (A.B.C). The compression technique may be applied iteratively and in addition to reducing the overhead required for multicasting, enables faster routing table look-up.

18 Claims, 3 Drawing Sheets

OTHER PUBLICATIONS

Internet Draft—"Connectionless Multicast"—Internet—at URL "http://info.internet.isi.edu:80/indrafts/files/draft-ooms-cl-multicast-00.txt"—Jun. 1999.

"Fast Address Lookup for Internet Routers"—Stefan Nilsson et al,—Internet at URL "http://www.nada.kth.se/~nilsson/public/papers/router" pp. 11-22, 1998.

Request for Comment 1458, *Requirements for Multicast Protocols*, R. Braudes, and S. Zabele, May 1993.

Fast address lookup for internet routers, S. Nilsson and G. Karlsson.

Connectionless Multicast, D. Ooms and W. Livens, Submitted to RAMA Working Group, Jun. 1999.

* cited by examiner

DEVICE AND METHOD TO COMPRESS DESTINATION ADDRESSES OF A MULTICAST MESSAGE

BACKGROUND OF THE INVENTION

The present invention relates to a device for compressing a list of destination addresses of a multicast message, and a method for compressing a list of destination addresses of a multicast message, a router of a communications network wherein such a device for compressing is included, and a host of a communications network wherein such a device for compressing is included.

Multicasting is the transmission of one and the same message to a set of destination hosts. Multicasting on the Internet allows to send IP (Internet Protocol) datagrams to every host who cares to listen without the necessity to send the IP datagrams individually to each destination. Broadcasting radio stations on the Internet, audio- or video-conferencing, publishing a newsletter, attending meetings without leaving the office, seeing lectures from professors, and many other applications become realistic without excessive bandwidth occupancy through multicasting. In a host-group implementation of IP multicasting, each multicasted IP packet carries an IP multicast address, which is a single IP destination address that identifies all group members of the multicast session. The membership of the host group is dynamic which means that destination hosts may join and leave the group at any time. The forwarding of IP multicast datagrams is handled by so called multicast routers which are IP routers that have the responsibility to forward IP multicast datagrams to all networks that have members of the destination host group. An overview of multicast protocols for a host implementation of IP multicasting, such as XTP (Xpress Transfer Protocol), ST-II (Experimental Internet Stream Protocol Version 2), MTP (Multicast Transport Protocol), is given in rfc1458 entitled 'Requirements for Multicast Protocols'. This IETF (Internet Engineering Task Force) submission is published on the Internet. The scalability of host implementation of IP multicasting for many groups however is a problem. In particular, the IP backbone network may suffer from scalability problems since the number of groups whose states have to be maintained there can be huge in case a separate multicast address has to be allocated to every small group of hosts attending for example an audio-conference or a video-conference. A connectionless implementation of IP multicasting, such as described in the Internet Draft entitled 'Connectionless Multicast', does not have the scalability problem of host implementations of IP multicasting since no state per multicast group is created in the IP routers. The latter Internet Draft proposes a multicast mechanism wherein each IP packet carries a list of all IP addresses of the multicast session members. In each router, the next hop for each destination in the list is determined by consulting the routing tables, and for every distinct next hop, a new IP header is constructed. This new IP header only contains a list of destinations for which that next hop is on the shortest path to the destinations. The main advantages of connectionless multicasting are that no multicast address allocation is required and routers do not have to maintain a state per session. Connectionless multicasting however requires each packet to contain all remaining destinations. Since the list of destination addresses might be long, connectionless multicasting may significantly increase the overhead and consequently reduce the effective throughput through the Internet.

The usefulness of a method and equipment for compressing the list of destination addresses in connectionless multicasted IP packets is expressed in paragraph 6 of the Internet Draft but a preferred implementation of the compression technique to be applied is not described therein. The authors of the Internet Draft already suggested that the compression method preferably should be based on detection of a common prefix. A common prefix based compression method for IP destination addresses is known for example from the article 'Fast Address Lookup for Internet Routers' from the authors Stefan Nilsson and Gunnar Karlsson. Therein, a method for compressing the information held by the routing table of IP routers is described. This compression technique replaces IP addresses with a prefix and skip value, the skip value representing the number of bits that can be skipped during a search operation. If in the list of destination addresses of a multicast message, destination addresses having a common prefix would be replaced with a compound destination address consisting of the common prefix and a skip number indicative for the number of irrelevant bits, every host whose address starts with the common prefix would receive the multicasted message, whether this host forms part of the original list of destinations or not. Thus, only sets of destination addresses having a common prefix and containing all possible suffixes could be compressed this way for multicast purposes. This known compression technique based on common prefixes would therefore be applicable very sparsely and, as a consequence, cannot significantly reduce the aggregate overhead generated for multicast traffic in the Internet.

SUMMARY OF THE INVENTION

An aspect of the present invention is to provide a device and method for compressing a list of destination addresses that is optimal for multicast purposes in a sense that it significantly reduces the overhead of multicasted packets in any connectionless multicast session wherein at least two destination addresses have a common prefix.

According to the invention, this aspect is achieved by the device for compressing a list of destination addresses of a multicast message, the method for compressing a list of destination addresses of a multicast message, the router of a communications network, and the host of a communications network.

Indeed, since the suffixes of the destination addresses are explicitly listed in the compound address, any set of destination addresses that has a common prefix can be compressed according to the present invention without any risk that non-members of the multicast session whose address also starts with the common prefix would receive the multicasted message. Moreover, as will be explained later on, compound addresses can further be combined with other destination addresses or other compound addresses, provided they all have a common prefix, to be further compressed into a new compound address. The present compression method in other words can be applied iteratively as long as there exists at least two addresses, destination addresses or compound destination addresses that have a common prefix. At each iteration, the overhead of the multicasted packets is further reduced.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Thus, any subset of IP addresses that has a common prefix can be compressed in accordance with the present invention.

Thus, if the list of destination addresses contains compound addresses and IP addresses that have a common prefix, a new compound address can be generated wherein the compound addresses and IP addresses are compressed. The current invention consequently can be applied iteratively so that first, a list of IP destination addresses with a rather large common prefix is compressed into a compound address. This compound address can then further be combined with other compound addresses or IP destination addresses that all have a shorter common prefix to generate a new compound address in a next compression iteration. Iterative application of the compression technique according to the present invention will be illustrated by means of a concrete example later on in this patent application.

Thus, a few compound addresses generated at a first compression iteration, may still have a common prefix and consequently may further be compressed into a new compound address at a second compression iteration.

In this way, the list of destination addresses of multicasted packets may be compressed before transmission thereof, thus reducing the overhead for connectionless multicasting on the outgoing links of the sourcing host.

In this way, the router that constructs a new header for each distinct next hop, can compress the list of destinations for which that next hop is on the shortest path to these destinations also in accordance with the present invention. In this way, the overhead transferred over the outgoing links of routers that forward connectionless multicasted packets is also significantly reduced.

Thus, the compound addresses not only reduce the overhead required to transfer connectionless multicasted messages to the different destinations, but also enable fast access to the routing tables in the routers. This is so because the routing tables do not have to be addressed separately for destinations whose addresses have a common prefix. If the table lookup mechanism involves testing address bits ordered from left to right (where left corresponds to the most significant part, i.e. the prefix), the common prefix of the compound address should be looked up only once as a result of which the routing table lookup performance increases.

BRIEF DESCRIPTION OF THE DRAWING

The above mentioned and other aspects and features of the invention will become more apparent and the invention itself will be best understood by referring to the following description of an embodiment taken in conjunction with the accompanying drawings, in which:

FIG. 2 is an exemplary embodiment of the destination list compression device according to the present invention; and.

DETAILED DESCRIPTION OF THE INVENTION

Figure 1:
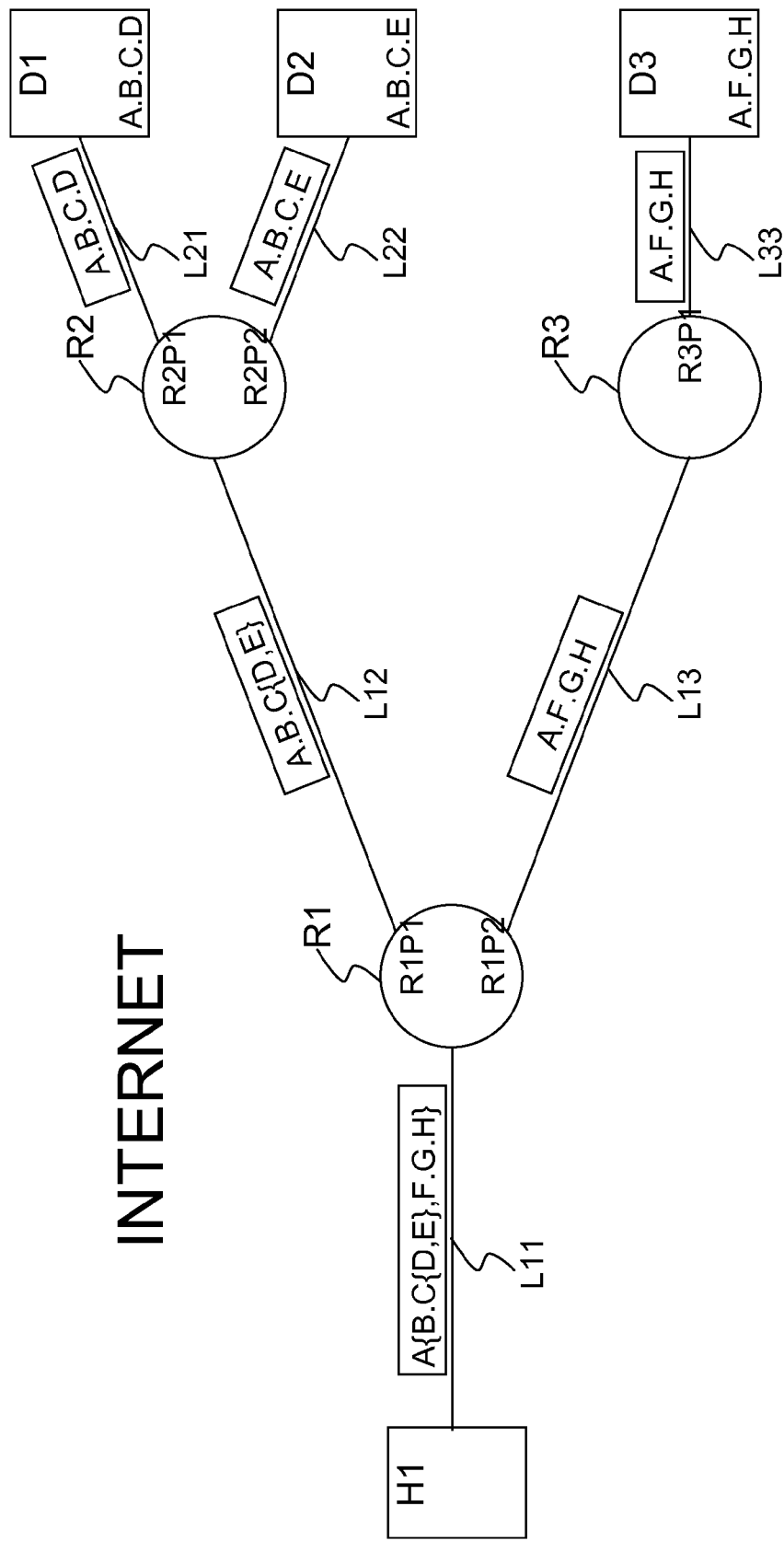
FIG. 1 is a scheme of an Internet INTERNET wherein the method for compressing a list of destination addresses of a multicast message according to the present invention is implemented.
Figure 2:
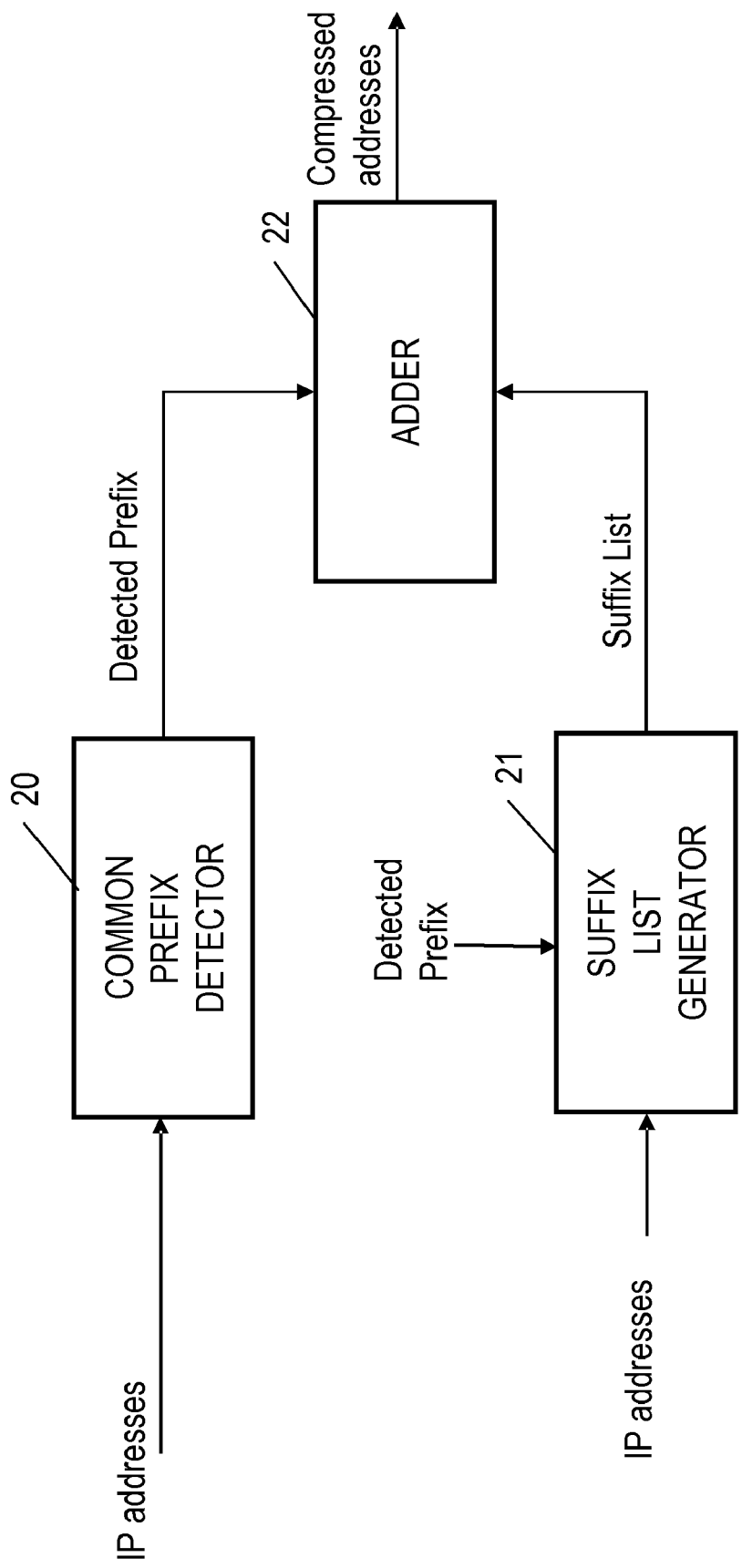

In FIG. 1, four hosts, H1, D1, D2 and D3, and three routers, R1, R2 and R3, of the Internet INTERNET are drawn. Host H1 is connected to a port of the first router R1 via link L11. The ports R1P1 and R1P2 of the first router R1 are interconnected with ports of respectively the second router R2 and the third router R3 via respectively the link L12 and the link L13. Link L21 connects port R2P1 of the second router R2 to a port of the host D1. Similarly, link L22 connects port R2P2 of the second router R2 to a port of host D2 and link L33 interconnects port R3P1 of router R3 with a port of host D3. As is indicated on FIG. 1, host D1 has address A.B.C.D, host D2 has address A.B.C.E and host D3 has address A.F.G.H. In these addresses, each letter is supposed to represent an octet so that each address consists of 32 bits (4 octets). Host H1 will play the role of sourcing host in the example described below so that its address does not need to be known in order to be able to illustrate the compression method according to the present invention. Host H1 and the three routers R1, R2 and R3 are supposed to incorporate a destination list compression device according to the present invention.

To explain the invented compression technique it is supposed that host H1 has to multicast an IP (Internet Protocol) datagram to the destination hosts D1, D2 and D3 and thereto applies connectionless multicasting. In the overhead section of this IP datagram, host H1 thus has to identify the destination hosts D1, D2 and D3 by their respective IP addresses A.B.C.D, A.B.C.E and A.F.G.H. The destination list compression device in host H1 will aid to realize this with low overhead consumption. The destination list compression device comprises a common prefix detector 20, a suffix list generator 21 and an adder 22 that adds common prefix and suffix list into a compound address. The common prefix detector 20 of the destination list compression device in host H1 detects that the addresses A.B.C.D and A.B.C.E of respectively host D1 and host D2 have a common prefix A.B.C. By subtracting this common prefix A.B.C from the addresses A.B.C.D and A.B.C.E, the suffix list generator 21 of the compression device obtains the suffixes D and E which it uses to generate a suffix list {D,E}. The adder 22 adds this suffix list {D,E} to the common prefix A.B.C to constitute a compound address A.B.C{D,E} that still indicates that the two hosts D1 and D2 belong to the destinations of the IP datagram but which contains only 5 octets, i.e., A, B, C, D and E, instead of the 8 octets, A, B, C, D, A, B, C and E, that have to be embedded in the IP datagram overhead if no compression is applied. As a result of the first iteration step in the compression method, host H1 obtains a list of destination addresses for the IP datagram to be multicasted that consists of the IP address A.F.G.H and the compound destination address A.B.C{D,E}. In a second iteration step, the compression device in host H1 detects that the IP address A.F.G.H and the compound address A.B.C{D,E} still have a common prefix A. By subtracting this common prefix A from the IP address A.F.G.H and the compound address A.B.C{D,E}, the compression device of host H1 generates the suffixes F.G.H and B.C{D,E} from which the list of suffixes {B.C{D,E},F.G.H} is constituted. This list of suffixes {B.C{D,E},F.G.H} is added to the common prefix A to generate a new compound address A{B.C{D,E},F.G.H} that indicates that the IP datagram has to be multicasted to the destination hosts D1, D2 and D3, but which thereto occupies only 8 octets, i.e., A, B, C, D, E, F, G, H, instead of the 12 octets, A, B, C, D, A, B, C, E, A, F, G and H, that would have been embedded in the overhead section of the IP datagram if no compression was applied. In this way, the overhead for transferring the IP datagram over link L11 has been reduced significantly.

Figure 3:
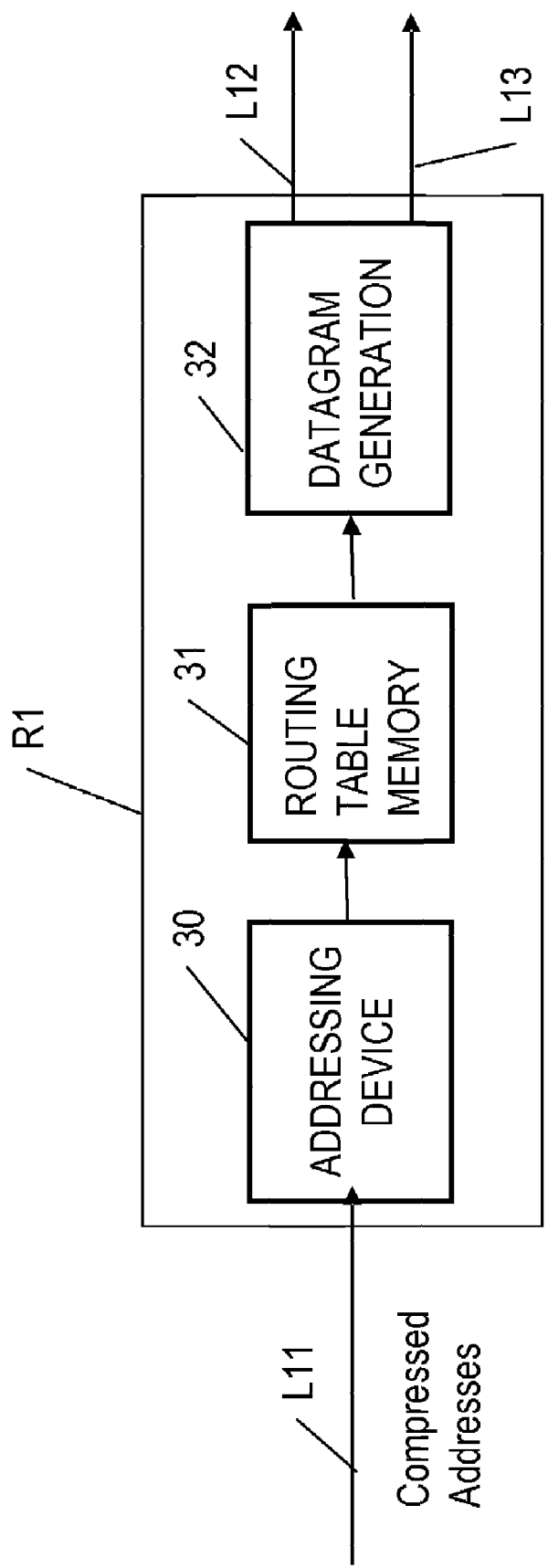
FIG. 3 is an exemplary illustration of an addressing device, routing table memory and datagram formation within a router which may incorporate the present invention.

Router R1, upon receipt of the IP datagram addresses its routing table 31 (FIG. 3) with the compound address A{B.C{D,E},F.G.H} supplied from addressing device 30. Such a routing table lookup involves testing the address bits ordered from left to right and is shortened if the compound address A{B.C{D,E},F.G.H} is used instead of the three addresses A.B.C.D, A.B.C.E and A.F.G.H because the common prefixes of the addresses, A and A.B.C, have to be looked up only once via the compound address A{B.C{D,E},F.G.H} instead of respectively three or two times. Routing table lookup performance hence is increased. From the routing table in router R1 it is derived that the destinations whose addresses start with prefix A.B.C, e.g. A.B.C.D and A.B.C.E, have router R2 as next hop on the shortest path thereto. The destination with address A.F.G.H has router R3 as next hop on the shortest path thereto. Router R1 consequently will constitute a new IP datagram in IP datagram generator 32 to be forwarded via link L12 to router R2 and a new IP datagram to be forwarded via link L13 to router R3. The payload sections of these new IP datagrams are copies of the payload section of the IP datagram received via link L11. In the overhead section of the IP datagram that will be forwarded over link L12, the list of addresses A.B.C.D and A.B.C.E has to be included. The compressed version of this list, A.B.C{D,E}, will be copied from the IP datagram received via link L11 into the header of the new IP datagram that will be transferred over link L12. Alternatively, this list will be re-compressed by the compression device in router R1. This compression device then detects the common prefix A.B.C in the addresses A.B.C.D and A.B.C.E. By subtracting this common prefix from the addresses A.B.C.D and A.B.C.E, the suffixes D and E are obtained, which are combined into a list of suffixes {D,E}. The latter list of suffixes {D,E} is added to the common prefix A.B.C to generate the compound address A.B.C{D,E} that will be embedded in the IP datagram that is forwarded via link L12 to router R2. In the overhead section of the IP datagram transferred over L12, the number of octets required to indicate that this IP datagram has to be forwarded to the destination hosts D1 and D2 is reduced from 8 to 5. In the header of the IP datagram that will be forwarded by router R1 over L13 to router R3, router R1 embeds the address A.F.G.H of destination hosts D3 which cannot be compressed anymore.

Router R2, upon receipt of the IP datagram forwarded over the link L12, addresses its routing table with the compound address A.B.C{D,E} subtracted from the header of this IP datagram. From the routing table in router R2 it is derived that the address A.B.C.D can be reached via port R2P1 and that the address A.B.C.E can be reached via port R2P2. Router R2 consequently will constitute a new IP datagram in whose header the address A.B.C.D will be embedded, and another new IP datagram in whose header the address A.B.C.E will be embedded. The payload sections of these new IP datagrams are again copies. The first IP datagram constituted by router R2 is forwarded via port R2P1 and link L21 to the destination host D1 whereas the second IP datagram constituted by router R2 is forwarded via port R2P2 and link L22 to the destination host D2. The addresses A.B.C.D and A.B.C.E cannot be compressed anymore although router R2 is supposed to incorporate a compression device according to the present invention.

Router R3, upon receipt of the IP datagram transferred over the link L13, addresses its routing table with the address A.F.G.H and derives from its routing table that the received IP datagram has to be forwarded via port R3P1 and link L33 to the destination host D3. Since there is only one next hop, this IP datagram can simply be copied and forwarded by router R3. No compression of the destination address is possible, although it is supposed that also router R3 is equipped with a compression device according to the present invention.

Summarizing, iterative application of the compression technique according to the present invention, allowed to reduce the overhead section that is indicative for the destination addresses of the multicasted IP datagram from 12 to 8 octets on link L11. On link L12 between router R1 and router R2, this overhead section could be reduced from 8 to 5 octets. It is clear that statistically the obtained reduction of overhead will be even more significant in case more destination hosts are member of the multicast session, and in case these destinations have longer common prefixes.

Although the above described embodiment concerns routing of IP (Internet Protocol) datagrams in the Internet, it will be obvious to any person skilled in the art of communication networks, that the application of the compression technique for a multicast destination address list is not limited to any particular network or internetwork, and accordingly also not to any particular format of the data packets. This invention in other words is more widely applicable than in the Internet.

It is also noticed that the compression technique according to the present invention does not necessarily have to be applied octet-aligned as described in the above example. The compression technique alternatively for example can be applied nibble-aligned or bit-aligned.

Furthermore, it is remarked that an embodiment of the present invention is described above rather in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention.

The invention claimed is:

1. A device for compressing a list of final destination addresses for a multicast message, wherein each final destination address in said list represents a different final destination host, said device comprising:
   a detector that detects a common prefix in at least two different final destination addresses from said list of final destination addresses,
   a generator that generates a suffix list for final destination addresses from said list of final destination addresses that are detected to have a common prefix, wherein said suffix list represents the non-identical portions of said final destination addresses detected to have a common prefix, and
   an adder that adds said suffix list to said common prefix to create a compound destination address consisting of compressed final destination addresses.

2. The device for compressing according to claim 1, wherein said list of destination addresses comprises Internet Protocol addresses.

3. The device for compressing according to claim 1, wherein said list of destination addresses comprises Internet Protocol addresses and other compound destination addresses.

4. The device for compressing according to claim 1, wherein said list of destination addresses comprises previously compressed compound destination addresses.

5. The device for compressing according to claim 1, wherein said device is incorporated in a host of a communications network having connectionless multicast transmission capabilities.

6. The device for compressing according to claim 1, wherein said device is incorporated in a router of a communications network having connectionless multicast forwarding capabilities.

7. A router according to claim 6, wherein said router further comprises:
   a routing table memory, and
   an addressing device to address said routing table memory via a compound address having the same format as said compound destination address.

8. The device for compressing according to claim 1, wherein said detector detects octet-aligned prefixes.

9. The device for compressing according to claim 1, wherein said detector detects nibble-aligned prefixes.

10. The device for compressing according to claim 1, wherein said detector detects bit-aligned prefixes.

11. The device for compressing according to claim 1, wherein said detector, said generator and said adder iteratively compress said list of final destination addresses.

12. A method for compressing a list of final destination addresses for a multicast message, wherein each final destination address in said list represents a different final destination host, said method comprises:
   detecting a common prefix in at least two different final destination addresses from said list of final destination addresses,
   generating a suffix list for final destination addresses from said list of final destination addresses that are detected to have a common prefix, wherein said suffix list represents the non-identical portions of said final destination addresses detected to have a common prefix, and
   adding said suffix list to said common prefix to create a compound destination address consisting of compressed final destination addresses.

13. The method for compressing according to claim 12, wherein detecting a common prefix further comprises detecting octet-aligned prefixes.

14. The method for compressing according to claim 12, wherein detecting a common prefix further comprises detecting nibble-aligned prefixes.

15. The method for compressing according to claim 12, wherein detecting a common prefix further comprises detecting bit-aligned prefixes.

16. The method for compressing according to claim 12, wherein the detection of a common prefix, the generation of a suffix list and the adding of the suffix list to the common prefix is iteratively performed for said list of final destination addresses.

17. A communications network comprising:
   a host that generates multicast packets, wherein said host includes a device for compressing a list of final destination addresses for a multicast packet, wherein each final destination address in said list represents a different final destination host, said device comprising:
      a detector that detects a common prefix in at least two different final destination addresses from said list of final destination addresses,
      a generator that generates a suffix list for final destination addresses from said list of final destination addresses that are detected to have a common prefix, wherein said suffix list represents the non-identical portions of said final destination addresses detected to have a common prefix, and
      an adder that adds said suffix list to said common prefix to create a compound destination address consisting of compressed final destination addresses; and
   a router connected to said host, wherein said router receives a compound destination address created by said host and derives the common prefixes from said compound destination address to determine the next hop for a multicast packet.

18. The communications network according to claim 17, wherein said router comprises a compression device for compressing a list of derived common prefixes and their respective suffixes, said compression device in said router comprising:
   a generator that generates a suffix list that represents non-identical portions for each of said common prefixes derived from said received compound destination address, and
   an adder that adds said respective suffix list to each of said derived common prefixes to create a new compound destination address consisting of compressed final destination addresses.

* * * * *